June 30, 1959     K. B. McGHEE ET AL     2,892,218
SPIN MOLDING OF CARBONACEOUS MIX Filed June 20, 1955     2 Sheets—Sheet 1

INVENTORS
KENNETH B. McGHEE
NEAL J. JOHNSON
BY Robert H. Dunlap
ATTORNEY

June 30, 1959  K. B. McGHEE ET AL  2,892,218
SPIN MOLDING OF CARBONACEOUS MIX
Filed June 20, 1955  2 Sheets-Sheet 2

INVENTORS
KENNETH B. McGHEE
NEAL J. JOHNSON
BY Robert H. Dunlap
ATTORNEY

United States Patent Office 2,892,218
Patented June 30, 1959

2,892,218

SPIN MOLDING OF CARBONACEOUS MIX

Kenneth B. McGhee and Neal J. Johnson, Niagara Falls, N.Y., assignors to Union Carbide Corporation, a corporation of New York Application June 20, 1955, Serial No. 516,396

6 Claims. (Cl. 18—58.3)

This invention relates to a method of forming carbon articles.

In the manufacture of carbon articles, finely divided carbonaceous material such as coke or coal or the like is intimately mixed with a binder, usually pitch, at a temperature somewhat above the melting point of the pitch, and the resulting mixture is shaped. The shaping operation is done in one of two ways—by compressing the mixture in a mold, or most commonly, by extruding it through a die. The shape so produced is "green," and must be baked for a prolonged period of time to carbonize the binder. After baking, the shape may be machined to produce the desired finished article. Because of the critical dimensions often required of such articles, this last operation results in much waste, and adds considerably to production costs.

Hitherto it has not been possible to mold directly hollow carbon shapes such as crucibles, owing to the poor fluidity of conventional carbon mixes. Where such mixes are soaked with excess pitch to improve their flowing consistency, and then molded, the thus formed articles undesirably have unpredictably and substantially different densities on bottom and side walls.

Accordingly, it is the prime object of this invention to provide a spin molding method whereby carbon articles may be molded by low pressure molding techniques.

A further object of the invention is to provide a method of rapidly forming thin wall, deep-drawn, closed end carbon articles with the aid of inexpensive, light weight molds.

A still further object of this invention is to eliminate the need for further machining of such carbon articles.

According to the invention, a conventional carbon mix including coke, coal or graphite and pitch is placed in a mold which is spun on its axis, and into which is inserted movable shaping means. The mix is pressed along the sides of the mold, mainly by the radial movement of the shaping tool with respect thereto, and partially by centrifugal force to form a compact hollow "green" cylinder. By moving the shaping tool axially with respect to the mold, the mix is compressed length-wise, and the excess forced into the bottom area. The "green" cylinders then can be baked in any carbon baking furnace.

Figure 1:
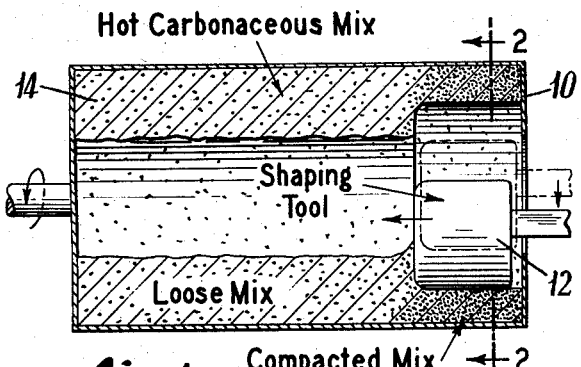
Fig. 1 is a vertical section through a forming mold at the beginning of operations.
Figure 2:
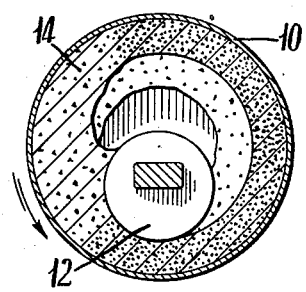
Fig. 2 is a vertical section on the line 2—2 of Fig. 1.
Figure 3:
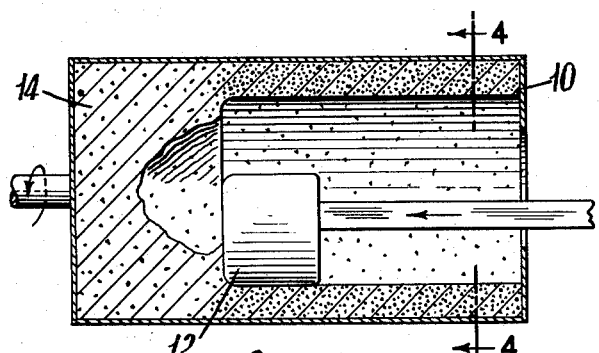
Fig. 3 is a vertical section through a forming mold during shaping operations.
Figure 4:
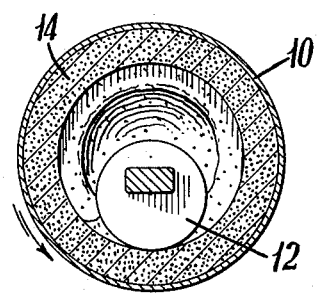
Fig. 4 is a vertical section on the line 4—4 of Fig. 3.
Figure 5:
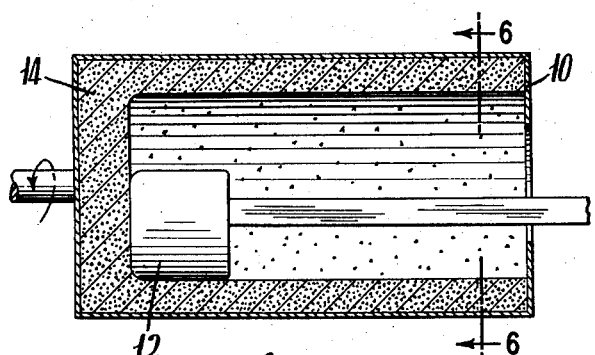
Fig. 5 is a vertical section through a forming mold near the end of the shaping operation.
Figure 6:
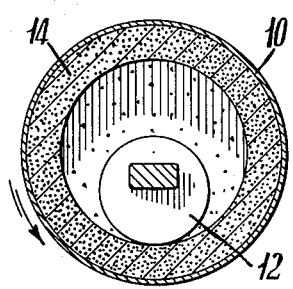
Fig. 6 is a vertical section on the line 6—6 of Fig. 5.

In a variant of the invention, Figs. 7 to 12 inclusive correspond to Figs. 1 to 6 respectively.

Apparatus suitable for the practice of the invention includes a mold which may be mounted horizontally or vertically; means for rotatably mounting the same as, for example, a lathe and a suitable shaping tool movable in substantially radial motion relative to the mold, and also capable of exerting length-wise pressure therein.

In practice, the mold may be constructed of metal or other suitable material. If desired, its walls can be tapered. Further, it may be constructed in several interfitting sections to form longer articles.

The shaping tool may be any metal roller or mandrel capable of exerting a pressure of about 1000 pounds per square inch. This tool may assume any convenient shape.

The shaping apparatus can be installed on a base such as a lathe table, and the mold located on a lathe head plate to which external power can provide rotation. The shaping tool may be secured on the carriage. Pressure may be applied to the tool through levers. Suitable heating means are supplied to the head plate, the shaping tool and mold.

As an example of the practice of the invention, crucibles having the dimensions 8 x 13½ inches outside diameter with a 6½ x 11½ inches cavity were made as follows: A mixture having the following composition 100 parts by weight of graphite flour
28 parts by weight of 30 medium pitch having a melting point of 100° C. to 105° C. was blended in a mixer at a temperature of 150° C. Next a steel mold indicated by reference character 10 in Figs. 1 to 6 was secured to the movable head plate of a lathe, and heated to about 100° C. A shaping tool 12 was then installed on the tailstock and heated to the same temperature as the mold. A dummy was next introduced in the mold to permit volumetric measure. Approximately 70 pounds of the above-mentioned hot mix 14 was then poured into the mold. The mold was then spun at 400 to 500 rotations per minute. The dummy was removed and the shaping tool inserted. As indicated on Figs. 3 and 4, radial movement of the shaping tool 12 compresses the mix along the walls of the mold. By next moving the shaping tool axially with respect to the mold, the desired depth of the crucible was obtained. The tool was next removed, and the shaped mix cooled until set by spinning. The mold was disengaged from the lathe and the molded carbon ejected. The thus-formed article was then baked in a carbon baking furnace with sand or sand and green carbon packed in the center. A suitable firing rate for this operation is 100° C. per day.

Figure 7:
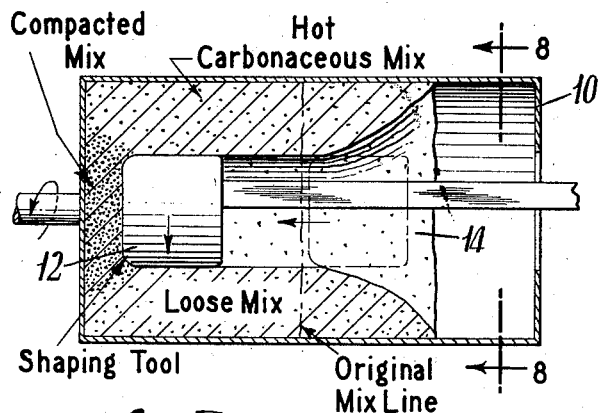
Figure 8:
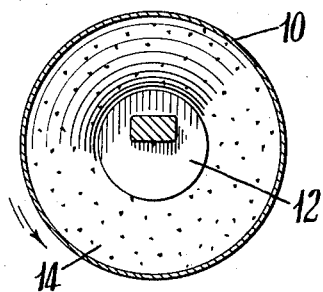
Figure 9:
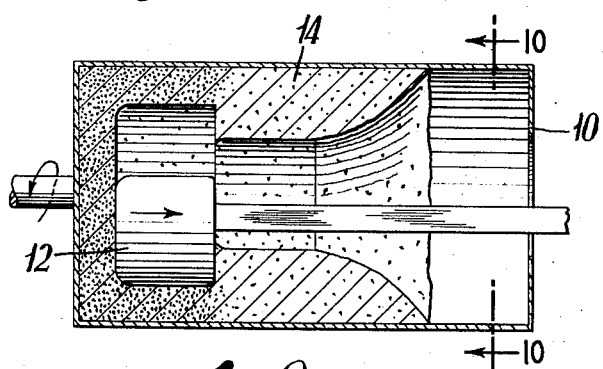
Figure 10:
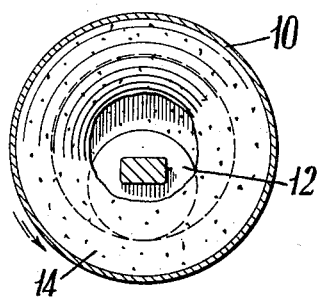
Figure 11:
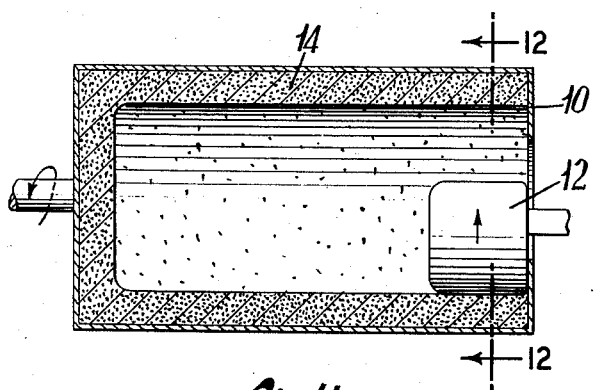
Figure 12:
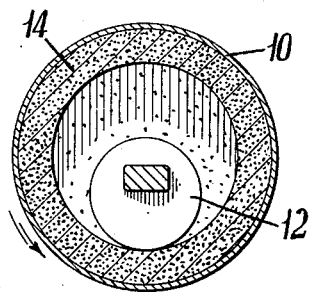

Figs. 7 to 12 inclusive illustrate a variant of the method particularly suitable where horizontal spinning is used. In its practice a mold 10 and a shaping tool 12 are heated first. This mold is filled with a weighted amount of carbonaceous mix. The mix is tamped lightly so that the mix line will remain vertical as the mold is installed on the horizontal spinning head. Next the mold containing mix is placed on a spinning head and rotated. The shaping tool is inserted in the mold and forced through the mix to compact a firm bottom section as shown in Figs. 7 and 8. Subsequently the shaping tool is moved radially to establish the inside diameter in the manner shown in Figs. 9 and 10. The final step shown in Figs. 11 and 12 consists in drawing the tool axially toward the open end of the mold to shape the wall section of the carbon article.

The above technique not only eliminates volumetric mold filling, but permits also the formation of a denser bottom section than is possible by the other method herein disclosed.

The mold is normally spun at a speed rapid enough that centrifugal force holds mix in the desired position, but yet not fast enough to create burning of the mix by friction.

Sections cut from a baked crucible had the following properties:

|  | Apparent Density, gm./cc. | Electrical Resistance, ohm-cm. |
|---|---|---|
| Upper Side: | | |
| A | 1.54 | .00317 |
| B | 1.53 | .00309 |
| Lower Side: | | |
| A | 1.57 | .00285 |
| B | 1.58 | .00276 |
| Bottom: | | |
| A | 1.59 | .00252 |
| B | 1.59 | .00243 |

The working operation tends to smear the binder on the surface of the shaped article to give a less permeable skin. This gives a better finish than machining, since the latter tends to tear out binder, and to open the pores of the carbon article. Additionally, the density of any portion can be regulated by the degree of pressure applied.

By the practice of the present method, a material is produced having characteristics which result in the grain orientation in a circumferential direction. Thus it is known that extruded stock is oriented with a longitudinal orientation parallel to the direction of extrusion and transverse normally to extrusion direction. Molding by one directional pressure produces stock having a longitudinal grain orientation normal to the direction of pressure application, and transverse parallel to the pressure. On the other hand, spin molded material has a longitudinal grain orientation circumferentially, and a transverse orientation radially through the wall thickness and axially along the wall. With the longitudinal grain and thermal expansion lower than obtainable by either machining or molding articles, the thermal qualities of a spin molded article are, therefore, better than otherwise obtainable.

The spin molding process also produces a high density section on the inner surface of the formed article. As a result, this portion of the wall section is on the average 5 to 7 points higher in apparent density than that of the article as a whole. This high density surface has a measurable depth. It has been determined further that the resultant wall thickness has a permeability approximately one-half that of conventional stock of similar density. Typical spin molded data is as follows:

|  | Whole Piece | Inner Skin |
|---|---|---|
| Apparent Density gm./cc. | 1.54 | 1.60 |
| Resistance ohm-cm. | Axial (Transverse) .0044 Wall Section | Circumferential (Longitudinal) .0036 Bottom |
| Permeability (Darcy's) | .174-.294 | .200-.253 |
| Permeability of Extruded 1.54 A.D. Stock | .35-.48 |  |

Another advantage of the method is that less pitch need be used than in mixes for other forms of shaping, this amount being only about 85 percent to 95 percent as great. The use of less pitch reduces the danger of distortion during baking. Further, as there is less volatile matter to be lost during baking, the finished product is less porous.

What is claimed is:

1. A method of shaping green carbonaceous articles, which comprises providing a hot carbonaceous mix comprising comminuted carbonaceous particles and a thermoplastic binder in a heated mold; rotating said mold at such a speed as to effect retention of said mix therein, while not burning the same by friction; compressing said mix against the sides of said mold by radially moving shaping heated means located within said mold; axially moving said means to compress the mix length-wise; continuing the rotation of said mold until the article can be removed without breakage or distortion, and ejecting the shaped article from said mold.

2. A method of shaping green carbonaceous articles, which comprises providing a hot carbonaceous mix comprising comminuted carmbonaceous particles and a thermoplastic binder in a rotating heated mold having internally located heated movable shaping means; rotating said mold at a speed of about 500 rotations per minute; compressing said mix at a pressure of about 1000 pounds per square inch against the internal surface of said rotating mold by radially moving aforesaid shaping means, axially moving said means to compress said mix; continuing the rotation of said mold until the formed article can be removed without breakage or distortion, and ejecting the shaped article from said mold.

3. A method of shaping green carbonaceous articles, which comprises providing a heated rotating mold having internally located movable shaping means, pre-heating said means; placing a hot carbonaceous mix containing comminuted carbonaceous particles and a thermoplastic binder in said mold; rotating said mold at a speed of about 500 rotations per minute, compressing said mix under a pressure of about 1000 pounds per square inch against the internal surface of said rotating mold by radially moving aforesaid shaping means; axially moving said means to compress said mix; continuing the rotation of said mold until said mix is cool, and ejecting the shaped article from said mold.

4. A method of shaping a green carbonaceous mix comprising carbonaceous particles and a thermoplastic binder, which method comprises placing said mix in a heated mold, continuously rotating said mold, inserting a heated shaping tool in the mold, forcing said shaping tool through the mix to compress a portion of said mix to form a section adjacent to one end of said mold, moving said tool radially to compress another part of said mix, drawing said tool axially to complete the shaping operation, continuing the rotation of said mold until the thus-formed article is cooled and ejecting the article from the mold.

5. A method of forming a carbon crucible from a green carbonaceous mix comprising carbonaceous particles and a thermoplastic binder, which method comprises placing said mix in a heated mold, continuously rotating said mold, inserting a heated shaping tool in said mold, forcing a portion of said mix to form a bottom section, moving said tool radially to compress said mix, and to form a lower portion of a side wall of a desired diameter, drawing said tool axially toward the open end of said mold to complete the shaping of the wall section of said crucible, and ejecting the shaped crucible from said mold.

6. A method of forming a crucible from a green carbonaceous mix comprising finely divided carbonaceous particles and a thermoplastic binder, which comprises placing such mix in a heated mold, rotating said mold, inserting a heated shaping tool in said mold, forcing said tool through said mix to compress the same and to form a bottom section for said crucible, moving the tool radially to compress said mix lengthwise, and to form a lower portion of the side wall of said crucible, drawing said tool axially toward the open end of said mold to complete the shaping of the wall section of said crucible, and ejecting the shaped crucible from said mold.

References Cited in the file of this patent

UNITED STATES PATENTS

| 716,630 | Eimer | Dec. 23, 1902 |
| 1,037,901 | Hansen | Sept. 10, 1912 |
| 1,637,707 | Porter | Aug. 2, 1927 |
| 1,769,841 | Jones | July 1, 1930 |
| 1,859,957 | Carfield | May 24, 1932 |
| 2,399,592 | Bradshaw | Apr. 30, 1946 |
| 2,563,285 | Shea et al. | Aug. 7, 1951 |